(12) United States Patent
Gaudin et al.

(10) Patent No.: US 11,567,838 B1
(45) Date of Patent: *Jan. 31, 2023

(54) ALERT MANAGEMENT FOR PARTIALLY MODIFIED LOG ENTRIES

(71) Applicant: Rapid7, Inc., Boston, MA (US)

(72) Inventors: Benoit Gaudin, Dublin (IE); Boris Afanasiev, Dublin (IE)

(73) Assignee: Rapid7, Inc., Boston, MA (US)

( * ) Notice: Subject to any disclaimer, the term of this patent is extended or adjusted under 35 U.S.C. 154(b) by 324 days.

This patent is subject to a terminal disclaimer.

(21) Appl. No.: 16/858,804

(22) Filed: Apr. 27, 2020

Related U.S. Application Data

(63) Continuation of application No. 16/833,898, filed on Mar. 30, 2020.

(51) Int. Cl.
| | | |
|---|---|---|
| *G06F 11/14* | (2006.01) | |
| *G06F 11/32* | (2006.01) | |
| *G06F 11/36* | (2006.01) | |
| *G06F 21/54* | (2013.01) | |

(52) U.S. Cl.
CPC ........ *G06F 11/1471* (2013.01); *G06F 11/327* (2013.01); *G06F 11/3636* (2013.01); *G06F 21/54* (2013.01)

(58) Field of Classification Search
CPC ... H04L 9/3213; H04L 9/0637; H04L 9/3228; G06F 21/44; G06F 21/6218
See application file for complete search history.

(56) References Cited

U.S. PATENT DOCUMENTS

| | | | |
|---|---|---|---|
| 5,909,580 A * | 6/1999 | Crelier | G06F 11/3624 717/131 |
| 8,954,926 B2 * | 2/2015 | Braun | G06F 11/3676 717/124 |
| 9,361,094 B1 * | 6/2016 | Xie | G06F 8/71 |
| 10,706,229 B2 | 7/2020 | Xu et al. | |
| 10,817,604 B1 * | 10/2020 | Kimball | G06F 8/73 |
| 2010/0017188 A1 * | 1/2010 | Shaffer | G06F 11/362 703/23 |
| 2012/0124047 A1 * | 5/2012 | Hubbard | G06F 16/332 707/769 |
| 2012/0197914 A1 | 8/2012 | Harnett et al. | |

(Continued)

*Primary Examiner* — Abu S Sholeman
(74) *Attorney, Agent, or Firm* — Ashwin Anand

(57) ABSTRACT

Disclosed herein are methods, systems, and processes for automated log entry identification and alert management. A log statement that includes a log format string and is part of program code associated with a computer program is accessed at a log management server. The execution of the log statement generates a log string that is associated with a trigger pattern of an alert configuration. A fixed part of the log format string that remains unchanged during execution of the log statement when the program code associated with the computer program is executed is extracted and a template is generated for the log statement to track changes to the fixed part of the log format string that causes a mismatch between the trigger pattern of the alert configuration and the log string. The template is then stored. A modification to the fixed part of the log format string is tracked using the template and the trigger pattern of the alert configuration that corresponds to the log string is updated based on the modification.

8 Claims, 12 Drawing Sheets

(56) References Cited

U.S. PATENT DOCUMENTS

| | | | |
|---|---|---|---|
| 2013/0232473 A1* | 9/2013 | Braun | G06F 11/3676 |
| | | | 717/124 |
| 2016/0224332 A1* | 8/2016 | Kitajima | G06F 8/658 |
| 2017/0315899 A1* | 11/2017 | Abdul | G06F 11/366 |
| 2019/0228085 A1 | 7/2019 | Biswas et al. | |
| 2020/0065220 A1* | 2/2020 | Sobran | G06F 11/3664 |
| 2020/0201744 A1 | 6/2020 | Ho et al. | |

\* cited by examiner

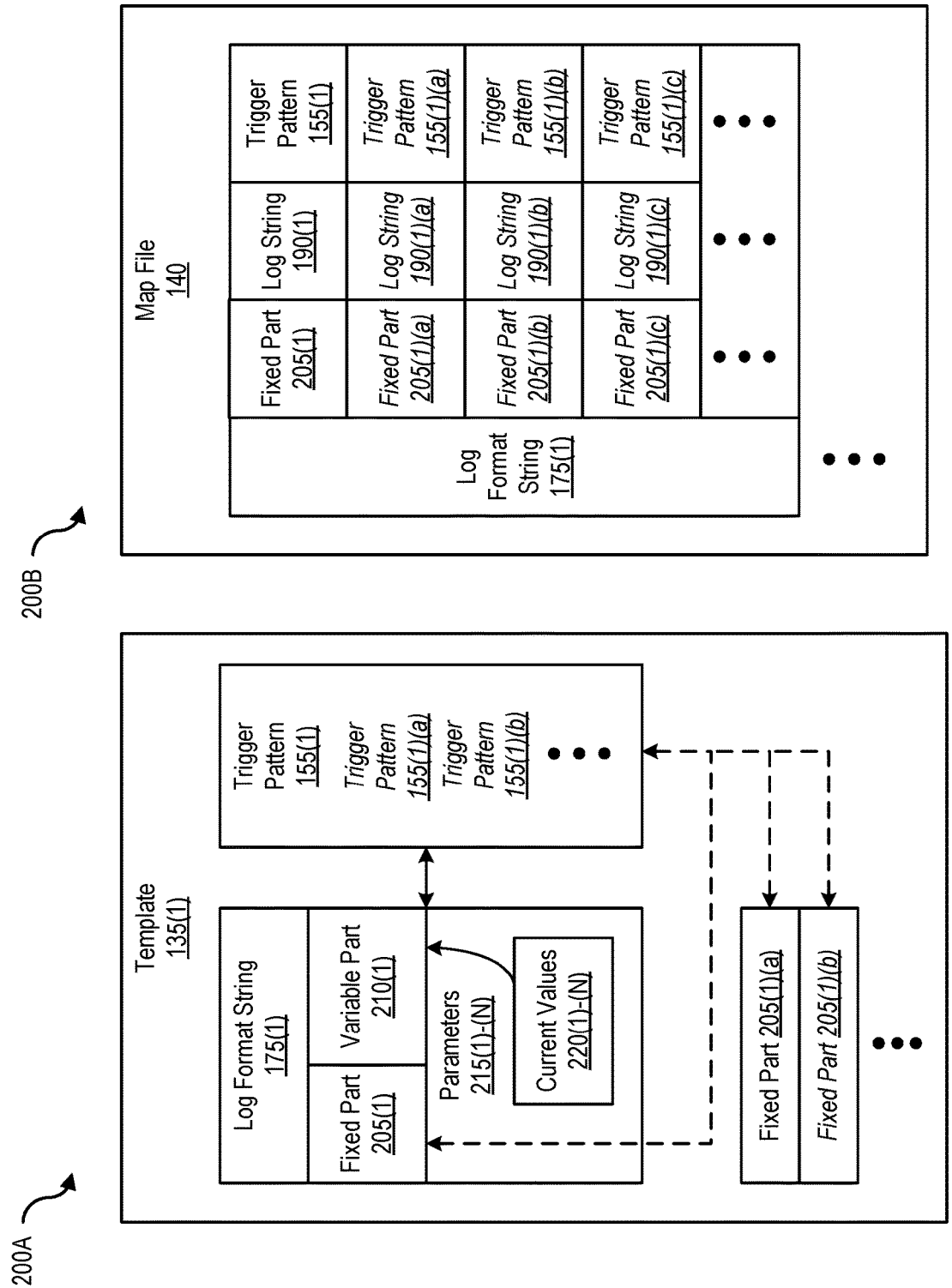

Program Statements
305(1) and 305(2)

```
void logSomething ( ) {
    LOGGER.critical ("{} green bottles hanging on a wall", bottleAmount);
}

Void logSomethingElse ( ) {
    LOGGER.critical ("There'll be {} green bottles hanging on the wall", bottleAmount);
}
```

*PRIOR ART*

Log Statements
170(1) and 170(1)(a)

```
void logSomething ( ) {
    LOGGER.critical ("{} green bottles hanging on a wall", bottleAmount).mail("someone@rapid7.com");
}

Void logSomethingElse ( ) {
    LOGGER.critical ("There'll be {} green bottles hanging on the wall", bottleAmount);
}
```

Log Statements
170(1) and 170(1)(a)

```
void logSomething () {
    LOGGER.critical ("{} green BOTTLES hanging on a wall", bottleAmount).mail("someone@rapid7.com");
}

Void logSomethingElse () {
    LOGGER.critical ("There'll be {} green bottles hanging on the wall", bottleAmount);
}
```

Buildtime Engine
120

```
[INFO] --- source-alterer-plugin:1.0.0-SNAPSHOT:validate-alerts (validate-log-statements) @class.with.log.statements ---
[INFO] Using 'UTF-8' encoding to copy filtered resources.
[INFO] Copying 1 resource
[INFO] Alerts to be deleted: 1
[WARNING] Alert "{} green bottles hanging on a wall" - 0afe85f2 should be deleted from InsightOps
[INFO] Alerts to be added: 1
[WARNING] Alert "{} green BOTTLES hanging on a wall" - db5c17d4 should be added to InsightOps
[INFO] ------------------------------------------------------------------
[INFO] BUILD SUCCESS
[INFO] ------------------------------------------------------------------
```

Log Statements
170(1) and 170(1)(a)

```
void logSomething () {
    LOGGER.critical ("And if one { } bottle hanging on a wall", bottleColor).mail("someone@rapid7.com");
}

Void logSomethingElse () {
    LOGGER.critical ("There'll be { } green bottles hanging on the wall", bottleAmount);
}
```

Runtime Engine
125

>> 07 Feb 2020 13:48:39.537 13:48:39.536 [main] INFO com.bnb.demo.SomeClass – And if one green bottle should accidentally fall 87a0d2e2 Critical

>> 07 Feb 2020 13:48:39.538 13:48:39.537 [main] INFO com.bnb.demo.SomeClass – And if one green bottle should accidentally fall 87a0d2e2 Critical

>> 07 Feb 2020 13:48:39.539 13:48:39.537 [main] INFO com.bnb.demo.SomeClass – And if one green bottle should accidentally fall 87a0d2e2 Critical

>> 07 Feb 2020 13:49:56.136 13:49:56.136 [main] INFO com.bnb.demo.SomeClass – And if one brown bottle should accidentally fall 87a0d2e2 Critical

>> 07 Feb 2020 13:49:56.974 13:49:56.973 [main] INFO com.bnb.demo.SomeClass – And if one brown bottle should accidentally fall 87a0d2e2 Critical

>> 07 Feb 2020 13:49:56.976 13:49:56.975 [main] INFO com.bnb.demo.SomeClass – And if one brown bottle should accidentally fall 87a0d2e2 Critical

ALERT MANAGEMENT FOR PARTIALLY MODIFIED LOG ENTRIES

CROSS-REFERENCE TO RELATED APPLICATIONS

The present application claims the benefit of and is a continuation of pending U.S. patent application Ser. No. 16/833,898 titled "Automated Log Entry Identification and Alert Management" and filed on Mar. 30, 2020, the disclosure of which is incorporated by reference as if set forth in its entirety herein.

BACKGROUND

Field of the Disclosure

This disclosure is related to log management in cybersecurity computing environments. In particular, this disclosure is related to optimizing log management by performing automated log entry identification and implementing alert management from source code.

Description of the Related Art

Log management involves collecting large volumes (e.g., gigabytes) of computer generated log messages (e.g., log data) to understand and manage security, system, and network operations in complex computing environments. Log data is typically generated by most computing, networking, and storage devices and includes technical and configuration information that can be used to effectively maintain computer programs, applications, and/or websites (e.g., to validate bugs, test new application features during software development, and the like).

Log data typically includes sequences of lines (e.g., log lines) that are generated by computer programs. These sequence of log lines can be voluminous while the set of program statements (e.g., log statements) that generate the sequence of log lines can be limited. Because the generated log lines can contain fixed and variable parts, identifying log lines generated by a single log statement (e.g., for alert management, and the like) is a technical challenge.

During software application development, developers can include log messages in program code of a computer program (e.g., source code) to configure program statements to generate alerts if and when the computer program is subsequently executed. Unfortunately, if certain portions of log lines that include such alert notifications are subsequently modified (e.g., by the same developer or by a different developer), the all-important alert associated with the original log line is not triggered. From a cybersecurity standpoint, the foregoing presents a significant danger to customers and clients in log data-based cybersecurity environments.

SUMMARY OF THE DISCLOSURE

Disclosed herein are methods, systems, and processes to perform automated log entry identification and alert management. One such method involves accessing a log statement is at a log management server. The log statement includes a log format string and is part of program code associated with a computer program. Execution of the log statement generates a log string (also called a log line) and the log string is associated with a trigger pattern of an alert configuration. The method further involves, extracting a fixed part of the log format string that remains unchanged during execution of the log statement when the program code associated with the computer program is executed, generating a template for the log statement to track changes to the fixed part of the log format string that causes a mismatch between the trigger pattern of the alert configuration and the log string, and storing the template.

In some embodiments, the method involves tracking a modification to the fixed part of the log format string using the template and updating the trigger pattern of the alert configuration that corresponds to the log string based on the modification. In other embodiments, the method involves extracting a variable part of the log format string that can vary during execution of the log statement based on parameter values and updating the template with identities of one or more placeholders and one or more parameters that are associated with the one or more placeholders.

In certain embodiments, the log format string includes placeholders and parameters. The execution of the log statement generates the log string by replacing the placeholders with the parameter values stored in the parameters and appending the log string to a log file that is ingested by the log management server. The log string appended to the log file is compared to the trigger pattern of the alert configuration once the log file is ingested by the log management server.

In some embodiments, the extracting is performed using static analysis techniques on the program code or source code associated with the computer program, the computer program is a web application that generates log data, and the log string is received by the log management server as part of log files that contain the log data from clients that execute computer programs. In other embodiments, the method involves determining that the fixed part or the variable part of the log format string has been modified and creating a map file that indicates a mapping correlation between the trigger pattern of the alert configuration and the log statement.

In one embodiment, the mapping correlation in the map file permits change coordination between the trigger pattern of the alert configuration and the log statement by requiring, as part of the updating, replacement of only a portion of the trigger pattern of the alert configuration that corresponds to the modification to the log format string of the log statement.

In certain embodiments, the log management server generates and stores at least: (a) templates to enumerate fixed parts, variable parts, and placeholders in log messages of log statements, (b) one or more models, based on the templates, of log statements that generate log lines, provided during buildtime to manage updates to a search engine, an alert manager, or an outlier detector, (c) at least one map file to manage change coordination between trigger patterns of alert configurations and log statements, and (d) at least one index to facilitate searching of modified log data.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its objects and features made apparent to those skilled in the art by referencing the accompanying drawings and/or figures.

FIG. 2A is a block diagram 200A of a template that illustrates the contents of a log message that generates log lines, according to one embodiment of the present disclosure.

FIG. 2B is a block diagram 200B of a map file for change coordination, according to one embodiment of the present disclosure.

FIG. 3A is a block diagram 300A of program statements, and has been labeled and/or designed as prior art.

FIG. 3B is a block diagram 300B of modified log statements, according to one embodiment of the present disclosure.

FIG. 4 is a block diagram 400 of a buildtime engine, according to one embodiment of the present disclosure.

FIG. 5 is a block diagram 500 of a runtime engine, according to one embodiment of the present disclosure.

Figure 1:
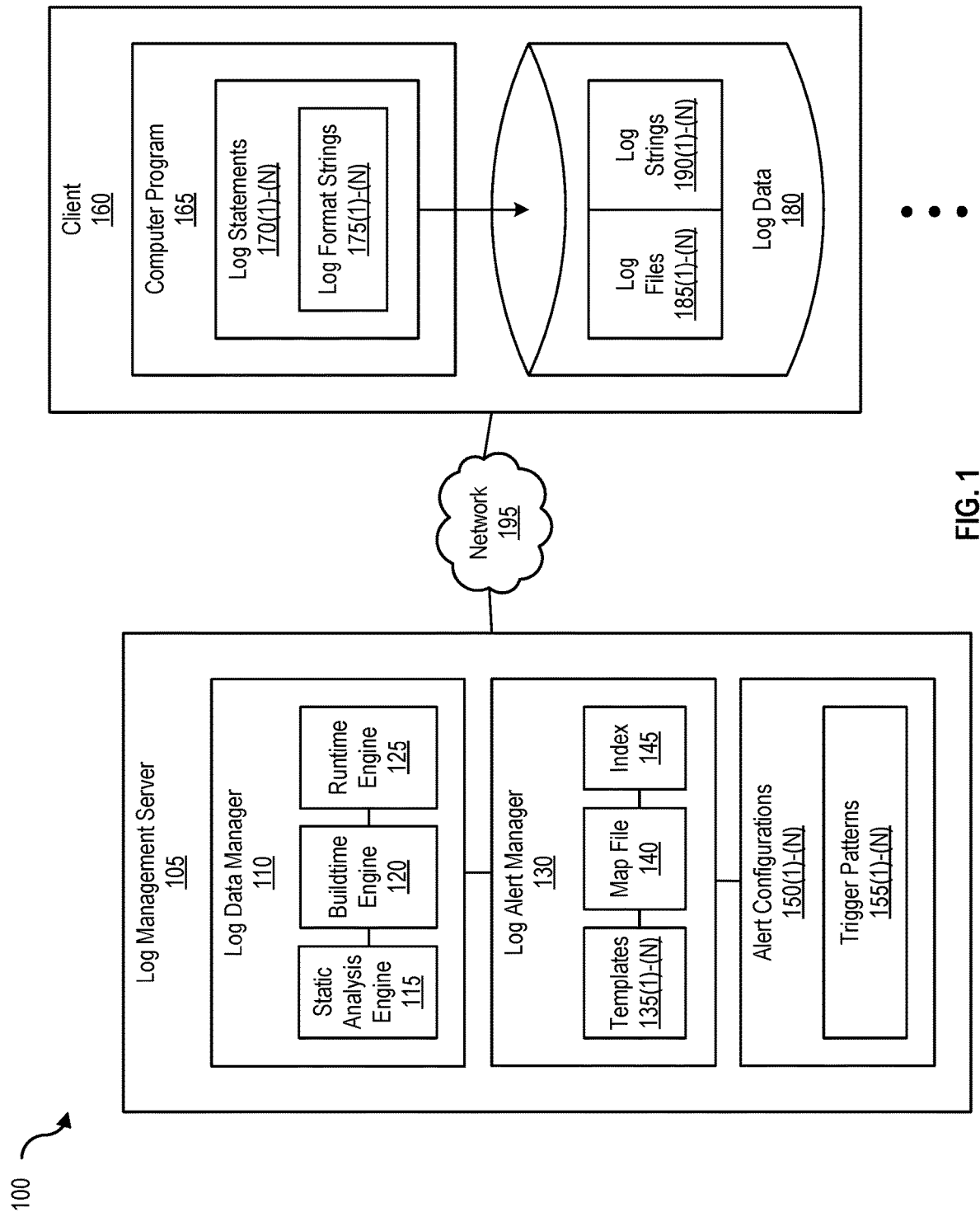
FIG. 1 is a block diagram 100 of a log management server that implements a log data manager and a log alert manager, according to one embodiment of the present disclosure.

Specific embodiments are examples in the diagrams and do not limit the disclosure to the particular form disclosed. Instead, they cover all modifications, equivalents, and alternatives falling within the spirit and scope of the disclosure as defined by the appended claims.

DETAILED DESCRIPTION

Introduction

Cybersecurity solutions and products that perform vulnerability risk management (VRM), incident detection and response (IDR), and the like, often depend on collecting and analyzing vast amounts of log data from protected client computers (e.g., laptops, desktops, mobile devices, and the like) to identify malicious processes and/or events. Log data is a file (or the data within the file) that is written to each time specific events occur in a controlling application (or computer program). Log files can be written to in the event of errors in the application or can simply include a log (a history) of all events that occurred in the computer program. Therefore, log files typically record events that occur in an operating system (OS) or during the execution of other software (e.g., a web application).

For example, an IDR product or solution typically includes some type of alerting mechanism that notifies a security administrator or security analyst (e.g., using an email alert or an instant message alert) that there may be certain events and/or processes associated with a given protected computing device, computer program, and/or application that demand further (or immediate) attention and/or action from a cybersecurity perspective (e.g., neutralizing a malicious process, remediating a vulnerability, and the like). Therefore, accurate and effective log management is of critical importance in cybersecurity computer environments.

Log management involves collecting large volumes (e.g., gigabytes) of computer generated log messages (e.g., log data) to understand and manage security, system, and network operations in complex networking environments. As noted, log data is typically generated by most computing and networking devices and includes technical and configuration information that can be used to effectively maintain computer programs, applications, and/or web sites (e.g., to validate bugs, test new application features during software development, and the like).

Log data typically includes sequences of lines (e.g., log lines) that are generated by computer programs. These sequence of log lines can be voluminous while the set of program statements (e.g., log statements) that generate the sequence of log lines can be limited. Because the generated log lines can contain variable parts, identifying log lines generated by a single log statement (e.g., for alert management purposes, and the like) is a technical challenge.

During software application development (e.g., at buildtime), developers include log messages in program code of a computer program (e.g., source code) to configure program statements to generate alerts if and when the computer program is subsequently executed. Unfortunately, if fixed portions of log lines that include such alert notifications are subsequently modified (e.g., by the same developer or by a different developer), the alert associated with the original log line is not triggered. From a cybersecurity standpoint, the foregoing presents a significant danger to customers and clients of log management products.

In addition to not providing a mechanism to automatically update alerts that may not fire if a log statement is subsequently modified (e.g., during buildtime), existing log management paradigms also do not facilitate the effective and efficient searching of log lines (and log data), do not facilitate provision of modified alerts (or updated alert configurations), and also do not permit the automated identification of rarely generated log lines that may (or may not) need to be prioritized with respect to alerting (e.g., for anomaly detection purposes). Although certain log management mechanisms may achieve somewhat comparable goals (e.g., by requiring users to manually provide rules that can help identify similar log entries or by automatically inferring such rule(s) from analyzing log data), inaccurate and time consuming approximations have to be made (e.g., without knowledge of source code of software that generates log data).

Disclosed herein are methods, systems, and processes to perform automated log entry identification and alert management to at least (a) facilitate automated log alert management, (b) simplify searching of log data, and (c) perform automatic detection of outliers (e.g., rarely generated log lines, among others) in cybersecurity computing environments.

Example Log Management Server

FIG. 1 is a block diagram 100 of a log management server 105 that implements a log data manager 110 and a log alert manager 130, according to one embodiment. Log management server 105 can include any type of computing device (e.g., with one or more processors, at least one memory device, and one or more storage devices) and includes (and implements) at least log data manager 110 (e.g., to analyze log data), log alert manager 130 (e.g., for automated log alert management), and one or more alert configurations 150(1)-(N). Log management server 105 can be any type of server computing device (e.g., a web server).

Log data manager 110 includes at least a static analysis engine 115, a buildtime engine 120, and a runtime engine 125. Static analysis engine 115 performs static analysis on source code (e.g., program code) associated with a computer program (e.g., static code analysis on program source code that includes one or more (embedded) log statements to enumerate various portions of the log statements). Buildtime engine 120 monitors, manages, and configures the buildtime phase of the program code (e.g., facilitating the tracking of changes or modifications made to log statements by a developer—at buildtime). Runtime engine 125 monitors, manages, and configures the runtime phase of the program code (e.g., automatically creating tags and alerts in log statements and automatically adding metadata to help with searching—at runtime).

Log alert manager 130 includes at least templates 135(1)-(N) (e.g., to track changes or modifications to portions of a log statement), a map file 140 (e.g., for change coordination between log lines and corresponding alerts), and an index 145 (e.g., for search optimization). If log data manager 110 indicates that a log statement has been changed or modified (e.g., during a subsequent development cycle), log alert manager 130 generates one or more templates to track changes or modifications to one or more portions of the log statement. Log alert manager 130 also maintains map file 140 to coordinate changes to the the log statement that requires corresponding updates to alert triggers of alert configurations. Index 145 serves as a search engine index for optimizing searching of log data and subsequent buildtime modifications of the log data.

Log management server 105 also manages, maintains, configures, and stores alert configurations 150(1)-(N). Each alert configuration 150(1)-(N) includes one or more trigger patterns 155(1)-(N). A trigger pattern, when matched, fires (or sends) an alert (e.g., to a security analyst) when a given log statement executes (e.g., as part of program code execution of a computer program) and a given log line is generated. The alert configuration of a trigger pattern manages the configuration of the trigger pattern, any rule changes or updates to the trigger pattern, and change coordination between trigger patterns and log statements (e.g., using templates and a map file). As noted, developers can modify program source code to include log statements (e.g., a form of program statements) that can be configured to trigger an alert when the log statement is executed and a given log line is generated. The foregoing is particularly useful for alert-based mechanisms that are part of various security products and solutions (e.g., IDR systems). Unfortunately, as noted, modifications to log statements can cause downstream problems.

Log management server 105 is communicatively coupled to one or more clients via network 195, which can be any type of network or interconnection. As shown in FIG. 1, client 160, which can be any type of physical or virtual computing device, executes computer program 165 which includes log statements 170(1)-(N) with log format strings 175(1)-(N). When executed by computer program 165, log statements 170(1)-(N) with log format strings 175(1)-(N) generate log lines 190(1)-(N) (also called log strings) that are then appended to log files 185(1)-(N) and stored as log data 180. Therefore, log data 180 generated by client 160 includes log files with log strings that are generated by the execution of one or more log statements.

A log statement is a type or form of a program statement that is configured to interact with log data generated by computing devices. Log statements can be used to record valuable runtime information about applications. For example, a log statement can be assigned a log level such that users or developers can disable verbose log messages (e.g., debug messages) while allowing the printing of other important log messages (e.g., error messages). As noted, log statements can be configured to trigger alerts and alert notifications and thus modifications to log format strings in log statements can cause a mismatch between generated log lines and alert triggers of alert configurations.

Example Log Modification Tracking Template for Alert Management

FIG. 2A is a block diagram 200A of a log modification tracking template that illustrates the contents of a log message that generates log lines, according to one embodiment. A template 135(1), which is a type of data structure, is maintained by log management server 105 and includes (the identities of) multiple log format strings and corresponding alert triggers. Template 135(1) also identifies, manages, and maintains modifications or changes to one or more portions of the log format strings (e.g., shown as fixed part 205(1)(*a*) and 205(1)(*b*) in FIG. 2A). For example, log format string 175(1) corresponds to alert trigger 155(1). Log format string 175(1), which is part of log statement 170(1), is typically composed of a fixed part 205(1), a variable part 210(1), and parameters 215(1)-(N) with current values 220(1)-(N). A fixed part of a log format string does not change the composition of a log line when a corresponding log statement is executed. However, a variable part of a log format string can change the composition of a log line when a corresponding log statement is executed.

A log statement (e.g., log statement 170(1)) typically includes a log format string (e.g., log format string 175(1)) along with zero or more placeholders (e.g., "Houston we have a { } problem" where { } is a placeholder) and zero or more parameters (e.g., parameters 215(1)-(N)). When a log statement is executed (e.g., as part of program code of a compute program), a log string (also called a log line) is generated by replacing any placeholders with current values (e.g., current values 220(1)-(N)) stored in parameters (e.g., parameters 215(1)-(N)) and appending the log string (or log line) to a log file (e.g., one or more log strings 190(1)-(N) appended to one or more log files 185(1) as shown in FIG. 1).

For example, if a log statement has a parameter called "size" (e.g., parameter 215(1)) and at the moment of log statement execution (e.g., at runtime), the (current) value of the parameter is "little" (e.g., current value 220(1)), the log statement will produce or generate the following log string or log line—"Houston we have a little problem." Therefore, depending on the parameter and corresponding parameter value (e.g., current value of a given parameter), a client device with logging software can log one of many log strings or log lines (e.g., "Houston we have a big problem," "Houston we have a serious problem," "Houston we have a huge problem," and the like). Consequently, the log format string (e.g., log format string 175(1)) represents text that does not change during program execution where as the log statement parameter values can vary during program execution (e.g., little, big, huge, tiny, and the like).

Log management server 105 ingests log data 180. For example, if a log statement is executed and a log string (or log line) is generated and appended to a log file, the log (e.g., log data 180) is ingested into log management server 105. Once ingested, log alert manager 130 compares the ingested log line against existing alert configurations (e.g., against trigger patterns of alert configurations). For example, a trigger pattern can be a string (e.g., "Houston we have") or a regular expression (regex). In order to be able to trigger the corresponding alert, the trigger pattern has to represent some part or the whole of the log line (or log string) generated by the log statement. A significant (and dangerous) problem is created if a trigger pattern is "Washington we have" and the generated log line is "Houston we have" because the trigger pattern will not fire or send an alert notification (e.g., to an IDR system). Thus, the alert simply will not be triggered. Therefore, template 135(1) (or a similar or comparable data structure) is used by log management server 105 to automatically track changes in log format strings.

It should be noted that in this example, template 135(1) tracks text that does not change during program execution (e.g., "Houston we have a { } problem"). However, fixed parts of log format strings in log statements can be modified by developers (e.g., during programming, updating program code, debugging, modifying alerts, and the like). Therefore, if log management server 105 receives or ingests a modified log format string in a log statement (e.g., "Houston we have a { } problem→"Boston we have a { } problem"), log management server 105 automatically updates a trigger pattern in the corresponding alert configuration maintained by log management server 105 (e.g., "Houston we have a"→"Boston we have") and synchronizes this change with client 160 (e.g., using map file 140).

Example Map File to Manage and Synchronize Updates to Alert Triggers

FIG. 2B is a block diagram 200B of a mapping mechanism to manage change coordination required by updates to trigger patterns of an alert configuration caused by modifications to log format strings, according to one embodiment. Map file 140, which is a type of mapping data structure, is maintained by log management server 105 (e.g., as part of log alert manager 140). Map file 140 identifies at least log format strings, the fixed part and modifications to the fixed part of log format strings, and corresponding trigger patterns (and modifications to trigger patterns necessitated by modifications to the fixed part of a log format string). Map file 140 is synchronized from one or more clients to log management server 105 (client to server) to ensure that updates to log format strings and updates to trigger patterns can be accurately reflected and synchronized between client(s) and server in a timely manner.

For example, as shown in FIG. 2B, map file 140 identifies log format string 175(1), fixed part 205(1) of log format string 175(1) and modifications to fixed part 205(1)— fixed parts 205(1)(a), 205(1)(b), 205(1)(c), and the like. In addition, map file 140 also identifies the (original or first) log string generated by the log statement that includes log format string 175(1) (e.g., log string 190(1), as well as any differences (or deltas) between the original log string and subsequently modified log strings (e.g., log strings 190(1)(a), 190(1)(b), 190(1)(c), and the like). While a fixed part of a log format string does not change as the result of log statement execution, it should be noted that developers (or others) may voluntarily or even inadvertently change or modify fixed part(s) (e.g., text) of log format strings that can cause a mismatch with trigger patterns.

Therefore, in addition to fixed parts and modifications to fixed parts as well as corresponding log strings (original and subsequent versions), map file 140 also identifies trigger pattern 155(1) and updates to trigger pattern 155(1) necessitated by modifications to fixed part 205(1) (e.g., trigger patterns 155(1)(a), 155(1)(b), 155(1)(c), and the like). Because log management server 105 has the ability to actively manage and update trigger patterns of alert configurations, log alert manager 130 can use template 130(1) (as shown in FIG. 2A) and map file 140 (as shown in FIG. 2B) to perform automated log entry identification and alert management (in conjunction with log data manager 110).

Example of Performing Automated Log Entry Identification and Alert Management

Figure 2C:
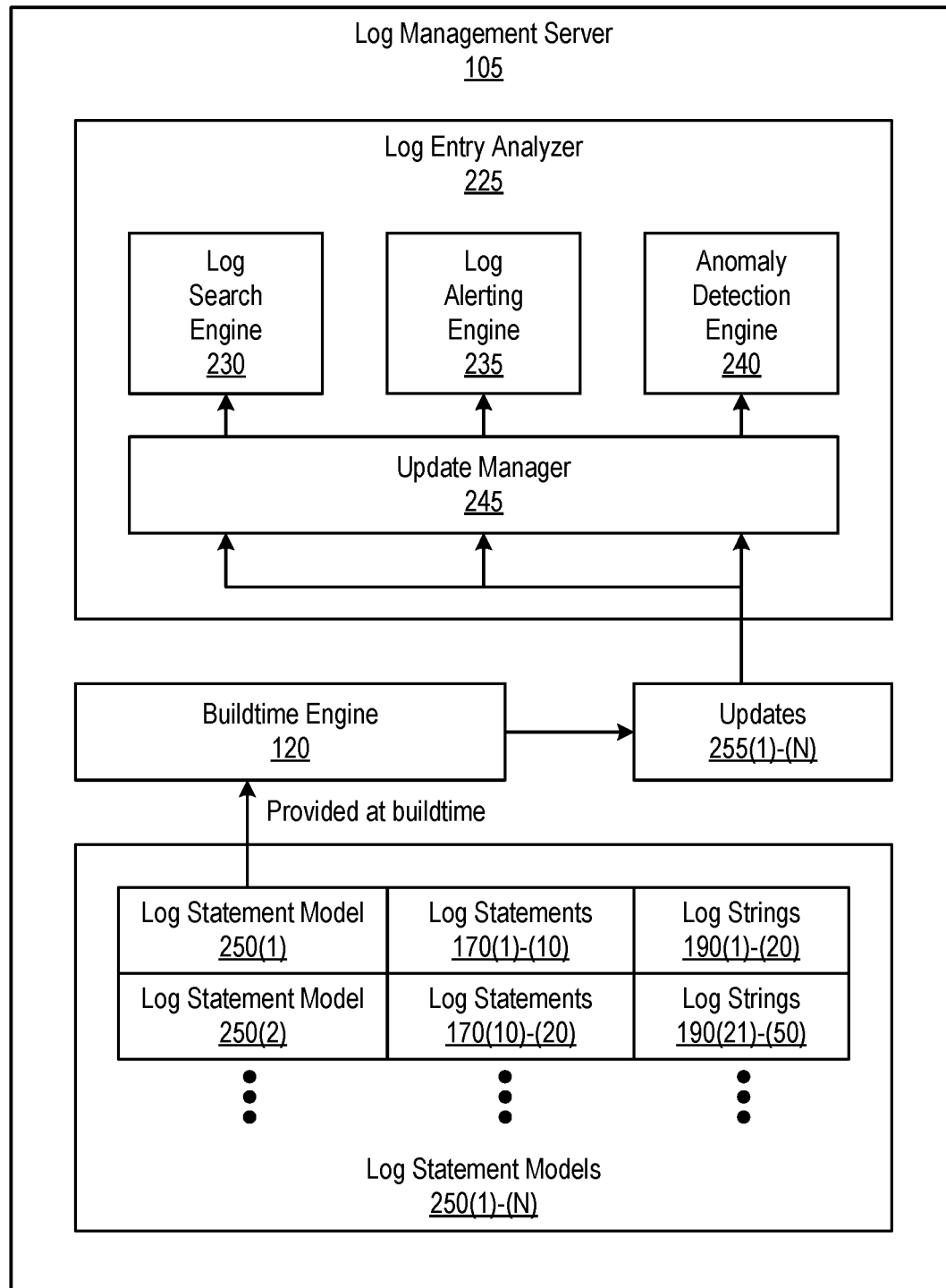
FIG. 2C is a block diagram 200C of a log management server that implements a log entry analyzer, according to one embodiment of the present disclosure.

FIG. 2C is a block diagram 200C of log management server 105 that implements a log entry analyzer 225, according to one embodiment. Log entry analyzer 225 includes a log search engine 230, a log alerting engine 235, and an anomaly detection engine 240. Log entry analyzer 225 analyzes log data to perform automated log entry identification, log alerting engine 235 performs automated alert management, and anomaly detection engine 240 performs automatic detection of outliers (e.g., rarely generated log lines). Log management server 105 of FIG. 2C receives or accesses log structure by analyzing source code in order to perform log versioning within log management software (e.g., detection of new log statements as well as removed log statements) to improve search (e.g., a regex index like index 145 of FIG. 1), ease of use (e.g., by not requiring regex) and log identification while providing increased cost efficiency (e.g., by reducing the amount of data sent between client 160 and log management server 105).

Log search engine 230, log alerting engine 235, and anomaly detection engine 240 receive updates 255(1)-(N) via update manager 245 (e.g., updates to log statements or log format strings—at buildtime). Buildtime engine 120 provides such updates to update manager 245 at buildtime in the form of log statement models 250(1)-(N). For example, log statement models 250(1)-(N) include one or more log statement models (e.g., log statement models 250(1) and 250(2)) with corresponding log statements (e.g., log statements 170(1)-(1) and 170(10)-(20)) and log strings (e.g., log strings 190(1)-(20) and 190(21)-(50)). Therefore, log entry analyzer 225 is provided a model of a set of log statements that generate log entries each time the set of log statement changes (e.g., at buildtime).

Log entry analyzer 225 performs at least three functions: (a) automated alert management, (b) search simplification, and (c) automatic detection of outliers (e.g., rarely generated log lines, and the like). Log entry analyzer 225 is provided with a model of a set of log statements that generate log entries (e.g., for searching, alerting, and/or anomaly detection, and the like) and log entry analyzer 225 automatically manages updates (e.g., to a search engine, alerts, and/or outlier detections). As previously noted, such models are provided each time the set of log statement changes (e.g., at buildtime).

In one embodiment, log data manager 110 accesses log statement 170(1) at log management server 105. A log statement is a subset of program statements (e.g., a=b+c, foo(bar), and the like) that produce log messages (e.g., LOGGER.warn ("Houston we have a problem")). Therefore, log statement 170(1) is a program statement that produces a log line (e.g., a log string as shown in FIG. 1). Log statement 170(1) includes log format string 175(1) (as shown in FIG. 2A) and log statement 170(1) is part of program code (e.g., source code) associated with computer program 165. The execution of log statement 170(1) (e.g., by computer program 165) generates log string 190(1) (e.g., a log line), and log string 190(1) is associated with trigger pattern 155(1) of alert configuration 150(1).

In some embodiments, static analysis engine 115 extracts a fixed part of log format string 175(1) (e.g., fixed part 205(1) as shown in FIG. 2A). As noted, fixed part 205(1) remains unchanged during execution of log statement 170(1) when program code associated with computer program 165 is executed. Log alert manager 130 generates template 135(1) for log statement 170(1) to track changes to fixed part 205(1) of log format string 175(1) (e.g., as shown in FIG. 2B) that causes a problematic and potentially dangerous mismatch between trigger pattern 155(1) of alert configuration 150(1) and log string 190(1). Log alert manager 130 then stores template 135(1) (e.g., as part of log management server 105 or separately). In other embodiments, buildtime engine 120 tracks a modification to fixed part 205(1) of log format string 175(1) (e.g., fixed part 205(1)(a)) using template 135(1) and updates trigger pattern 155(1) of alert configuration 150(1) (e.g., trigger pattern 155(1)(a)). Once buildtime engine 120 determines that fixed part 205(1) of log format string 175(1) has been modified, log alert manager 130 creates or generates map file 140 that indicates a mapping correlation between trigger pattern 155(1) of alert configuration 150(1) and log statement 170(1) (and subsequent updates, as shown in FIG. 2B).

In certain embodiments, static analysis engine 115 extracts a variable part (e.g., variable part 210(1)) of log format string 175(1) that can vary during execution of log statement 170(1) based on (and because of) one or more (different) parameter values (e.g., current values 220(1)-(N) of parameter 215(1)). Log alert manager 130 then updates template 135(1) with identities of one or more placeholders and one or more parameters that are associated with the one or more placeholders (e.g., as shown in FIG. 2A). As previously noted, a log format string includes zero or more parameters and zero or more placeholders. The execution of log statement 170(1) generates log string 190(1) by replacing the one or more placeholders (e.g., in log format string 175(1)) with corresponding parameter values (e.g., current values 220(1)-(N) of parameters 215(1)-(N)) and appending (or attaching) log string 190(1) to log file 185(1) that is ingested by log management server 105 (as shown in FIG. 1). Log data manager 110 then compares log string 190(1) appended to log file 185(1) to trigger pattern 155(1) of alert configuration 150(1) once log file 185(1) is ingested by log management server 105.

In certain embodiments, the extracting is performed by static analysis engine 115 using one or more static analysis techniques on program code associated with computer program 165 (e.g., a web application). Static code analysis involves examining source code before a computer program is run (e.g., at buildtime), by analyzing a set of program code or source code against a set (or multiple sets) of coding rules (e.g., using buildtime engine 120). Static analysis engine 115 can implement software development tools that permit the changing of log documents directly from source control, thus permitting the performance of static code analysis on source code (e.g., JavaScript source code) with respect to log statements in log data.

Example Implementation of a Template, a Map File, and an Index

As shown in FIG. 1, log alert manager 130 of log management server 105 maintains templates 135(1)-(N), map file 140, and index 145. Templates 135(1)-(N) enumerate fixed parts, variable parts, and placeholders in log messages of log statements. As shown in FIG. 2C, log management server 105 also includes one or more models (e.g., log statement models 250(1)-(N)) that are generated based on one or more templates 135(1)-(N) of log statements (e.g., log statements 170(1)-(N)) that generates log lines (e.g., log strings 190(1)-(N)) and are provided during buildtime (e.g., to log entry analyzer 225 as shown in FIG. 2C).

Providing these log statement models to log entry analyzer 225 at buildtime permits log entry analyzer 225 to manage updates (e.g., updates 255(1)-(N)) to log search engine 230, log alerting engine 235, and anomaly detection engine 240 using update manager 245. Because modification of log statements causes mismatch between trigger patterns and log statements, in some embodiments, map file 140 manages change coordination between trigger patterns of alert configurations and log statements (e.g., as shown in FIG. 2B). One benefit, among many, of performing change coordination in this manner includes needing to replace only a portion of a trigger pattern of an alert configuration that corresponds to a modification to a log format string of a log statement (thus saving significant networking and storage resources as less data needs to be transferred between clients and log management systems).

In addition, and in other embodiments, because log statements are modified (e.g., voluntarily or inadvertently during software development—at buildtime), index 145 facilitates the optimized searching of modified log data (e.g., by the creation of tags (for alerts) and the automatic addition of metadata—metadata that identifies the source of the change as coming from the same log statement). Therefore, by maintaining source attribution of modifications to log statements, searching modified log data for trigger pattern mismatch correction and other tasks is significantly optimized in cybersecurity computing environments.

Example of Modifications to Log Statements that Cause Alert Mismatch

FIG. 3A is a block diagram 300A of program statements and FIG. 3B is a block diagram 300B of modified log statements with a trigger pattern of an alert configuration, according to one embodiment. A log statement is a subset of program statements that produce log messages (e.g., LOGGER.warn("Houston we have a problem"). Program statements can include any line of code (e.g., a=b+c, foo(bar), and the like). However, as used herein, the term program statement means "log statement"—which is a program statement that produces or generates a log line.

Program statements 305(1) and 305(2) are log statements that can be generated by a client device. For example, program statement 305(1) is LOGGER.critical ("There'll be { } green bottles hanging on the wall", bottleAmount). This program can be modified at buildtime as follows to create program statement 305(2): LOGGER.critical ("{ } green bottles hanging on the wall", bottleAmount), and would cause an alert mismatch.

For example, a trigger pattern for an alert configuration (e.g., an email alert) that is configured to fire or send an alert only when a log line produces "There'll be ten green bottles hanging on the wall" (e.g., based on current value substitution as a parameter value for placeholder { }). If program statement 305(1) is modified into program statement 305(2), as demonstrated above, this email alert will not be sent if the log line produced as a result of the modification is "ten green bottles hanging on the wall" (as the result of the deletion of the text "There'll be" for any reason—e.g., during software development, during debugging, or at any other buildtime stage).

Unfortunately, mismatched alerts such as the foregoing can cause significant problems in cybersecurity computing environments that depend on accurate and prompt alerting of events, processes, and the like. Without the knowledge of source code (e.g., the makeup and composition information of a given log format string gleaned from static code analysis of log statements embedded in program code), log management systems cannot promptly identify mismatched alerts and corresponding log statements. As noted, although identifying similar log entries using provided manual rules entries or inferring such rules from analyzing log data is possible, performing efficient log entry identification and alert management as disclosed here is not probable without the knowledge of source code of software that generates the required log data.

As shown in FIG. 3B, log statement 170(1) is as follows: LOGGER.critical ("There'll be { } green bottles hanging on the wall", bottleAmount). A log format string of log statement 170(1) can be modified by a developer by making changes to the fixed part of log statement 170(1) (e.g., text) and adding an alert trigger: (mail(someone@rapid7.com) (at runtime), thus creating log statement 170(1)(a) as shown in FIG. 4. Unfortunately, because of changes to the fixed part of the log format string of log statement 170(1) as evidenced in log statement 170(1)(a), the email alert to someone@rapid7.com will not be sent out as a result of the modification (because the resultant log line of "ten green bottles hanging on the wall" is mismatched with a trigger pattern of an alert configuration that expects "There'll be ten green bottles hanging on the wall"). Therefore, in certain embodiments, log data manager 110 extracts fixed parts and variable parts of log format strings of log statements to generate a model of log data that can be generated by computer program 165 to solve, among other technology-related problems in log management, the disconnect between source code and alert definitions.

Therefore, log management server 105 generates, creates, and/or implements a logging library to define alerts within source code (as shown in FIG. 2B). Buildtime engine 120 detects changes to log format strings of log statements (e.g., to fixed parts or variable parts) at buildtime, and runtime engine 125 creates alerts at runtime (e.g., using the logging library). Consequently, log management server is capable of performing at least three separate and interconnected operations: (a) static analysis at buildtime using static analysis engine 115 and buildtime engine 120 that use log data ingested by log data manager 110 from client 160, (b) creating a logging library at runtime using runtime engine 125 (e.g., for developers to utilize) with the ability to specify alerts in program source code (as shown in FIG. 3B), and (c) the ability to enhance the logging library with metadata (e.g., alerts and special values (color, amount, and the like, for "bottle")— because log data manager 110 has access to the log statement of a given log message, such attributes can be used to perform semantic analysis).

At runtime, the metadata can be used to assist with log search by at least (a) identifying key/value (KV) pairs (e.g., by parsing log lines) and (b) performing indexing to enhance search capability (e.g., by indexing a particular part of a log line (that is modified, that changes, will be modified, or is likely to be modified). As shown in FIG. 1, index 145 is maintained by log alert manager 130 for indexing only particular parts of log lines. Buildtime checks and runtime operations are discussed in greater detail with respect to FIGS. 4 and 5, supra. In this manner, log alert manager 130 can use templates, map file 140, and index 145 to generate and enhance a logging library to optimize log data management.

Therefore, in addition to overcoming the disconnect between source code and alert definitions, log management server 105 can automatically identify which log lines were generated from a single program statement (or a single log statement) by performing static analysis on program source code (e.g., of computer program 165). The output of this static analysis (e.g., the output provided by static analysis engine 115) is a template (e.g., template 135(1) as shown in FIG. 2A) of each log line (or log string) that can be generated by computer program 165. Log management server 105 automates the identification of similar log entries (e.g., generated from a single program/log statement) as well as which part of the log entries are variables. Doing so positively impacts log data management by making it possible to automate the detection of outliers as well as to accurately perform searches and clustering on log data.

Example Buildtime Checks

FIG. 4 is a block diagram 400 of a buildtime engine, according to one embodiment of the present disclosure. Buildtime engine 120 validates log statements and determines at least (a) alerts to be deleted and (b) alerts to be added. Because log statement 170(1) has been modified (e.g., to remove "There'll be" and capitalize "bottles"), buildtime engine 120 removes "{ } green bottles hanging on a wall" from alert configurations and adds "{ } green BOTTLES hanging on a wall" to alert configurations at buildtime. This buildtime check ensures that trigger patterns of alert configurations and log lines produced by modified log format strings are not mismatched. Log data typically provides visibility on the behavior of a black box system. Existing products and implementations that make it possible to identify similar log entries rely on rules that are manually provided by users. By contrast, log data analyzer 225 (of FIG. 2C) facilitates an automated method, system, and process to accurately generate such rules.

For example, static analysis engine 115 performs static source code analysis at buildtime. Static analysis engine 115 applies one or more static analysis techniques on software source code (e.g., of computer program 165) in order to extract a list of log line templates. For each log statement, the fixed part and variable part of the generated log lines is identified (e.g., as shown in FIG. 2A). This list represents a model (e.g., a log statement model) of log data that can be generated by the software under interest. This step, as noted, is typically applied during the software build phase. Therefore, given log data generated by the software under interest, the model generated from the source code is used by log management server 105 to identify log lines generated by a single program (e.g., using regex matching, among other methodologies).

Example Runtime Enhancements

FIG. 5 is a block diagram 500 of a runtime engine, according to one embodiment. At runtime, runtime engine 125 performs at least two operations: (a) automatic creation of tags and alerts (e.g., if placeholder ({ }) and associated parameter value changes from 'bottleAmount' in log statement 170(1) to 'bottleColor' in log statement 170(1)(a) along with the addition of the someone@rapid7.com alert) and (b) the automatic addition of metadata to help with searching, as discussed above (e.g., '87a0d2ec' in FIG. 5 indicates that all the log lines (shown in runtime engine 125 in FIG. 5) are generated by the same log statement).

Figure 6A:
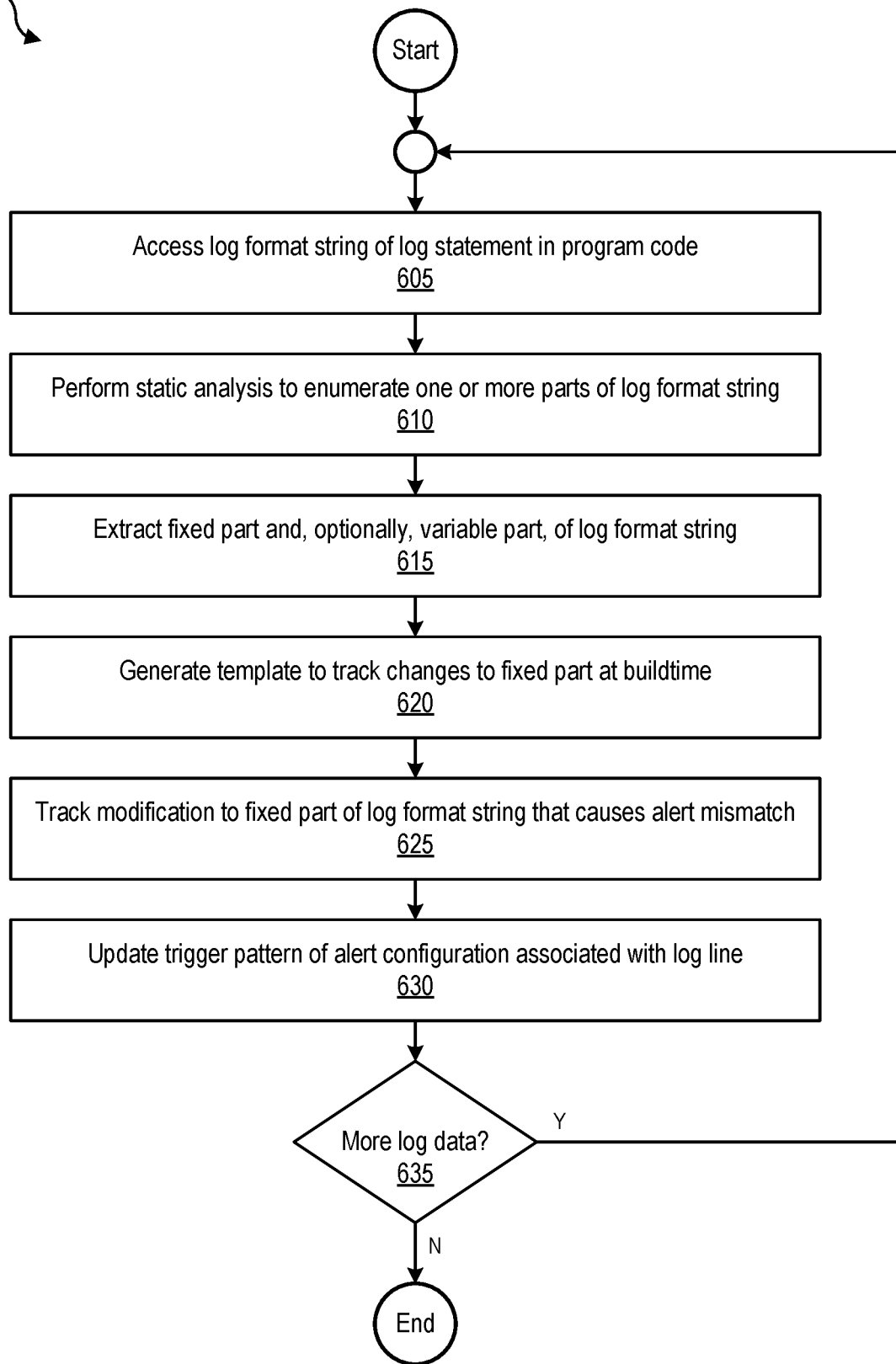
FIG. 6A is a flowchart 600A of a process to update a trigger pattern of an alert configuration, according to one embodiment of the present disclosure.

Example Processes for Log Entry Identification and Enhancement of Logging Library FIG. 6A is a flowchart 600A of a process to update a trigger pattern of an alert configuration, according to one embodiment. The process begins at 605 by accessing (or receiving) a log format string (e.g., log format string 175(1)) of a log statement (e.g., log statement 170(1)) in program code. As noted, log management server 105 can ingest log data in the form of log files (with appended log lines) from clients (as shown in FIG. 1). At 610, the process performs static analysis to enumerate one or more parts of the log format string. For example, log data manager 110 processes the ingested log data from client 160 and static analysis engine 115 identifies the fixed and variable parts of log format string 175(1) based on log string 190(1) generated by log format string 175(1) using one or more static analysis tools (e.g., one or more language-based tools from the following categories: multi-language, .NET, Ada, C or C++ tools, Java, JavaScript, Objective-C or Objective C++, Opa, Packaging, Perl, PL/SQL, Python, Transact-SQL as well as one or more formal method tools (e.g., tools that use static program assertions).

Therefore, at 615, the process extracts a fixed part, and optionally, a variable part of the log format string, and at 620, generates a template to track changes to the fixed part (at buildtime. For example, once the fixed (and/or the variable) part of log format string 175(1) that generated log string 190(1) are identified or captured by static analysis engine 115, log alert manager 130 generates template 135(1) (as shown in FIG. 2A) to track (all subsequent) changes to fixed part 205(1) (e.g., as 205(1)(a), 205(1)(b), and the like, as shown in FIG. 2A) at build time (in coordination with buildtime engine 120 of log data manager 110). At 625, the process tracks modifications to the fixed part of the log format string that causes alert mismatch, and at 630, updates the trigger pattern of the alert configuration associated with the log line (generated by the log statement in question). The process ends at 635 by determining if there is more log data. If there is more log data, the process loops to 605. Otherwise, the process ends.

As previously discussed, static analysis of log entries has several benefits in the realm of efficient and optimized log data management. First, identifying fixed parts of log entries and constantly tracking changes to fixed parts of log entries (as early as the buildtime phase) permits a log management system and an IDR system to promptly update mismatched alerts, thus, adding an important measure of safety in cybersecurity environments that depend on log data.

Second, because the log management system (that manages log data), developer devices (that can make changes to program source code), the client(s) (where program(s) execute), and the IDR (or any other type of cybersecurity) system (that provide security-based alerts among other functions) are synchronized with respect to log data and changes to log data, modifications to log entries based on differing parameter values for placeholders for variable parts of log statements can be tracked, cataloged, logged, and stored to optimize search of a logging library that can be effectively used by software developers and security analysts alike.

Third, because log management server 105 is configured to maintain a historical track record of changes to particular parts of log entries that are modified or are subject to modification, anomaly detection engine 240 of log entry analyzer 225 can detect and identify outliers in log data (e.g., rarely generated log lines). For example, if templates, map file and 140, and index 145 indicate that only the fixed part or the variable part of a given log statement is typically modified (e.g., textual changes to the fixed part and/or a given set of expected or previously-seen parameter values for variable part placeholders), any subsequent changes to the given log statement that do not fall within expected limits and/or boundaries can be promptly tagged as potentially anomalous outliers and forwarded to a security analyst for further inspection and analysis.

Figure 6B:
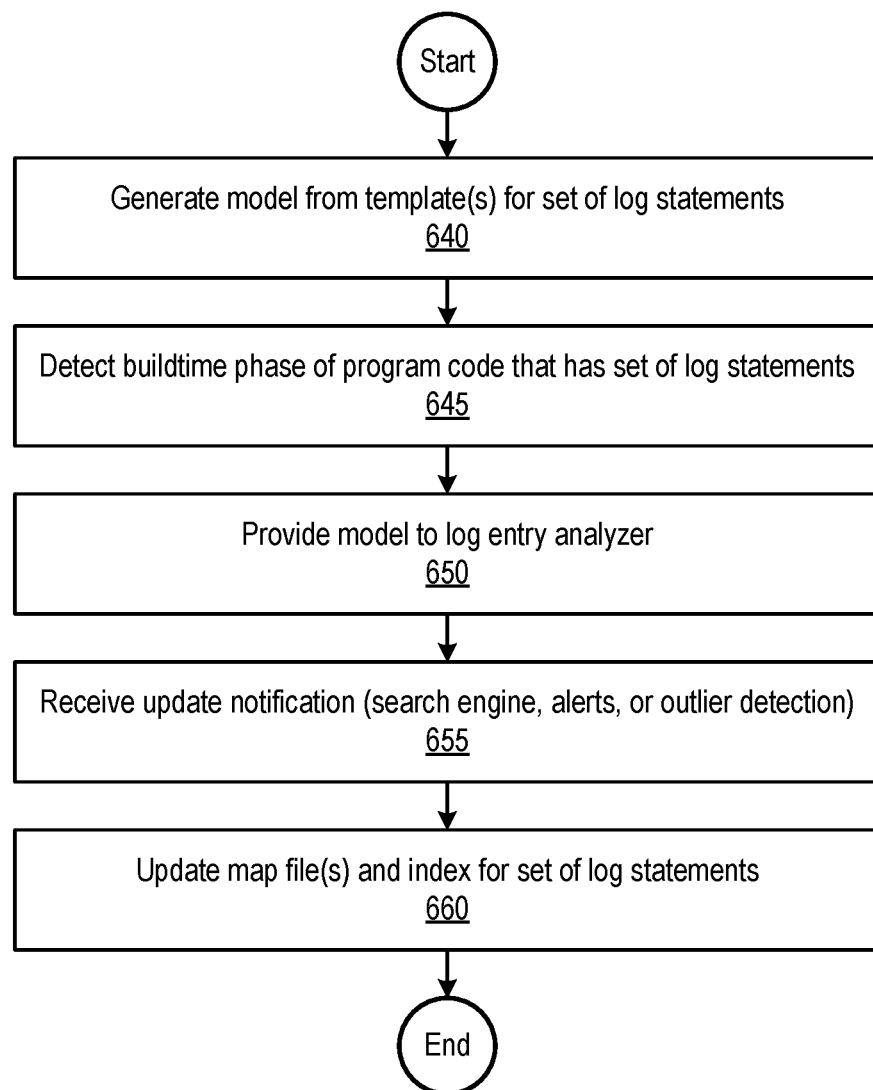
FIG. 6B is a flowchart 600B of a process to update a map file and an index, according to one embodiment of the present disclosure.

FIG. 6B is a flowchart 600B of a process to update a map file and an index, according to one embodiment. The process begins at 605 by generating a model from templates for a set of log statements. For example, log statement model 250(1) is generated by log management server 105 from template 135(1) (with log format strings 175(1)-(10)) for log statements 170(1)-(10) (as shown in FIG. 2C). At 610, buildtime engine 120 of log data manager 110 detects a (subsequent) buildtime phase of the program code that has the set of log statements (e.g., on a client device or a developer device), and at 650, provides the model to log entry analyzer 225 (e.g., as updates 255(1)-(N))— to determine whether changes to the set of log statements emanate from the same program code. At 655, log entry analyzer 225 receives, an update notification (e.g., with updates 255(1)-(N)) at update manager 245 for log search engine 230, log alerting engine 235, and anomaly detection engine 240 (as shown in FIG. 2C). The process ends at 660 by updating map file 140 and index 145 for the set of log statements (e.g., for log data (and log data delta) synchronization, change coordination, logging library metadata enhancement (for use at subsequent runtime of the set of log statements), among other uses).

Figure 7A:
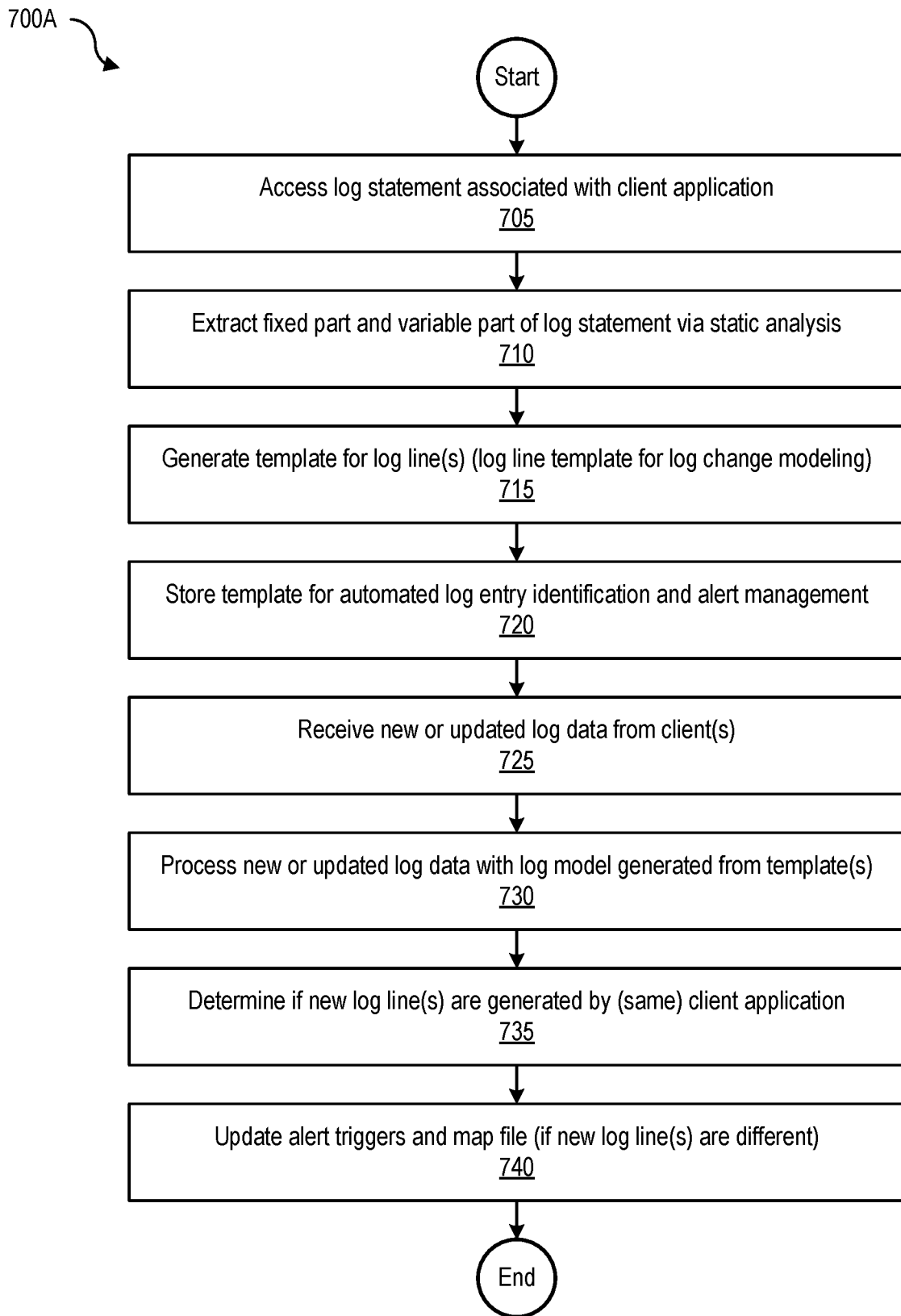
FIG. 7A is a flowchart 700A of a process to update alert triggers, according to one embodiment of the present disclosure.

FIG. 7A is a flowchart 700A of a process to update alert triggers, according to one embodiment. The process begins at 705 by accessing a log statement associated with a client application (e.g., log statement 170(1) associated with computer program 165 as shown in FIG. 1). At 710, the process extracts a fixed part (e.g., fixed part 205(1)) and a variable part (e.g., variable part 210(1)) of the log statement via static (code) analysis (e.g., using static analysis engine 115). At 715, the process generates a template for log line(s) (e.g., template 135(1) that is a log line template for change modeling).

At 720, the process stores the template for automated log entry identification and alert management, and at 725, receives new or updated log data from client(s) (e.g., log string 190(1)(a) as shown in map file 140 of FIG. 2B). At 730, the new or updated log data is processed with a log model generated from the template(s) (e.g., log statement model 250(1)). At 735, a determination is made if the new log line(s) are generated by the (same) client application (e.g., based on log statement model 250(1) for log statement 170(1) generated from template 135(1)). The process ends at 740 by updating alert triggers and map file 140 (e.g., if the new log line(s) are different, trigger pattern 155(1) of alert configuration 150(1) is updated).

Figure 7B:
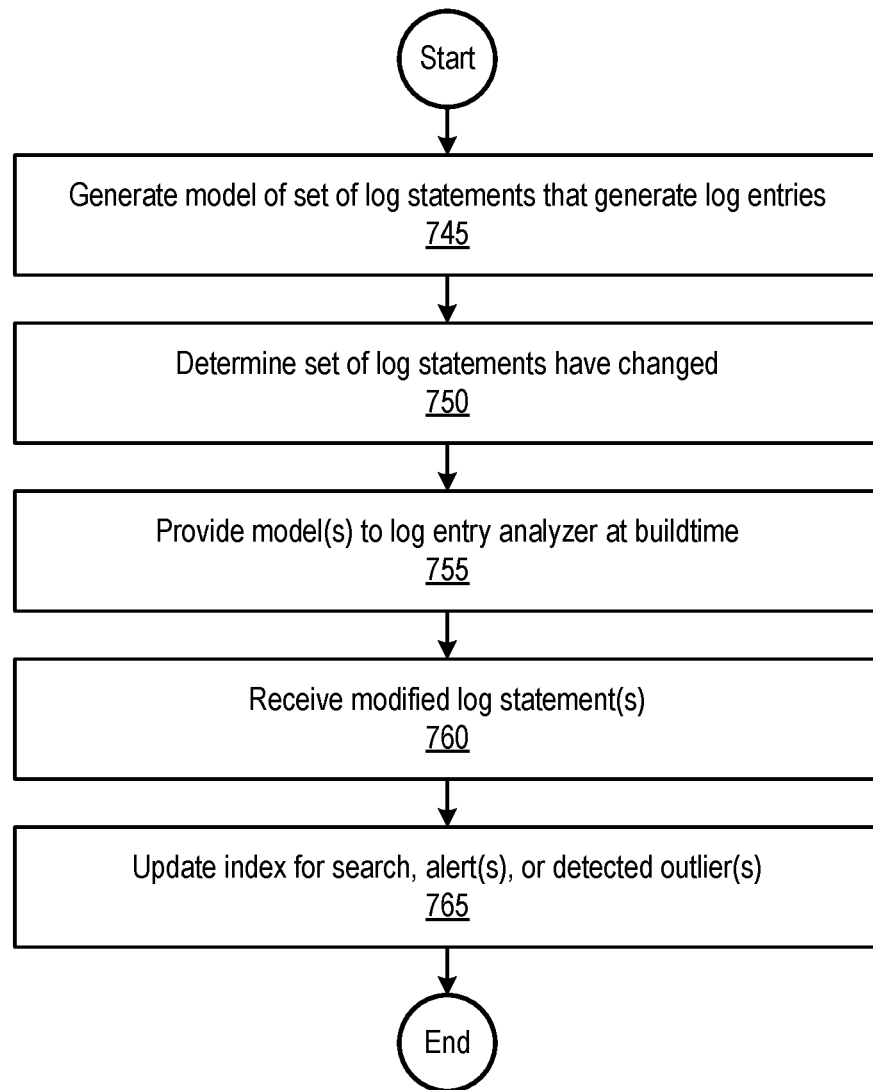
FIG. 7B is a flowchart 700B of a process to update an index for search, update alert(s), or update detected outlier(s), according to one embodiment of the present disclosure.

FIG. 7B is a flowchart 700B of a process to update an index for search, update alert(s), or update detected outlier(s), according to one embodiment. The process begins at 745 by generating a model for a set of log statements (e.g., log statement model 250(1) for log statements 170(1)-(10) as shown in FIG. 2C) that generate log entries (e.g., log strings or log lines). At 750, the process determines that the set of log statements have changed. At 755, the process provides the model(s) to log entry analyzer 225 at buildtime, and at 760, receives modified log statement(s). The process ends at 765 by updating index 145 for search, alert(s), and detected outlier(s).

Therefore, it will be appreciated that the various methods, systems, processes, data structures, and models disclosed and described herein at least: (1) perform automated log entry identification and alert management, (2) implement static code analysis of log entries, (3) prevent alert and log line mismatch, (4) generate a logging library for developers, (5) enhance the logging library with metadata to optimize log data search, (6) detect outliers and anomalies in log data, and (7) synchronize log data and modifications to log data between log management, client, developer, and/or cybersecurity computing systems.

Examples of Search Optimization and Anomaly Detection

In one embodiment, a logging library can be enhanced with metadata to optimize log data search. For example, with a model of log statements (e.g., a set of fixed string+placeholders, as discussed above), log management server 105 can search for all log entries (e.g., log strings or log lines) that match a certain pair (e.g., a fixed string+placeholders). In another embodiment, detected anomalies can be associated with changes in fixed parts of log statements.

In certain embodiments, identifying outliers involves classifying log entries (e.g., log lines or log strings) with respect to log statements in a template—a log entry X1 is identified as matching log statement Y1, log entry X2 is identified as matching log statement Y2, log entry X3 is identified as matching log statement Y3, and so on and so forth. In this example, log statement Y1 would have had two matches, log statement Y2 would have had one match, and if we assume there is a log statement Y3, log statement Y3 would have had zero matches.

Log management server 105 (e.g., a log management system) keeps track of the number of matches per log statement over time to (trigger an) alert whenever a log statement gets a new match even though the given log statement has not received a new match in a given (previous and pre-determined) span of time (e.g., several days, weeks, and the like—to be defined by a user of the log management system).

In some embodiments, log management server 105 determines that log entries that represent error messages (or other random messages) generally only trigger seldomly (e.g., in practice, log entries that represent error messages are only rarely triggered). Under such 'normal' behavior or conditions, no such log entries should be generated as part of the code containing the corresponding log statement—the foregoing log entries generation should only happen when an issue occurs (e.g., abnormal or anomalous behavior).

The technical benefit of the foregoing approach is that the user of the log management system can configure and/or set just one (a single) alert (e.g., an alert that says "If a log entry matches a log statement for which there has not been any other match in the previous 'N' week, then trigger an alert"). An added technical benefit is that the foregoing alert can be configured and set without defining a trigger pattern based on a fixed part of a log statement.

Example Computing Environment

Figure 8:
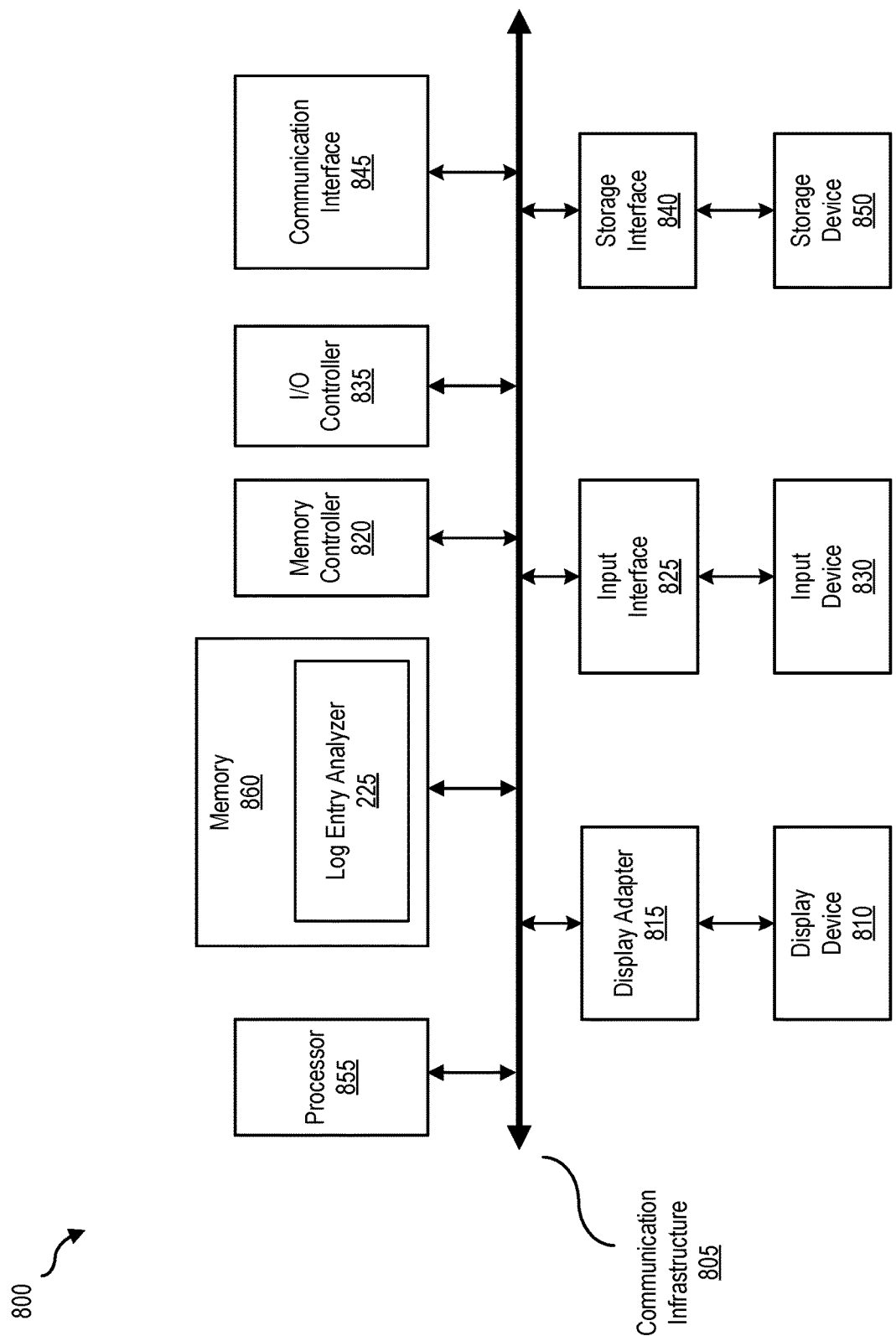
FIG. 8 is a block diagram 800 of a computing system, illustrating how a log entry analyzer can be implemented in software, according to one embodiment of the present disclosure.

FIG. 8 is a block diagram 800 of a computing system, illustrating how a log entry analyzer can be implemented in software, according to one embodiment. Computing system 800 can include log management server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes log data manager 110, log alert manager 130, and/or log entry analyzer 225, computing system 800 becomes a special purpose computing device that is configured to perform automated log entry identification and alert management.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing log data manager 110, log alert manager 130, and/or log entry analyzer 225 may be loaded into memory 860. Log management server 105 may include memory 860 in addition to other forms of memory.

In certain embodiments, computing system 800 may also include components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
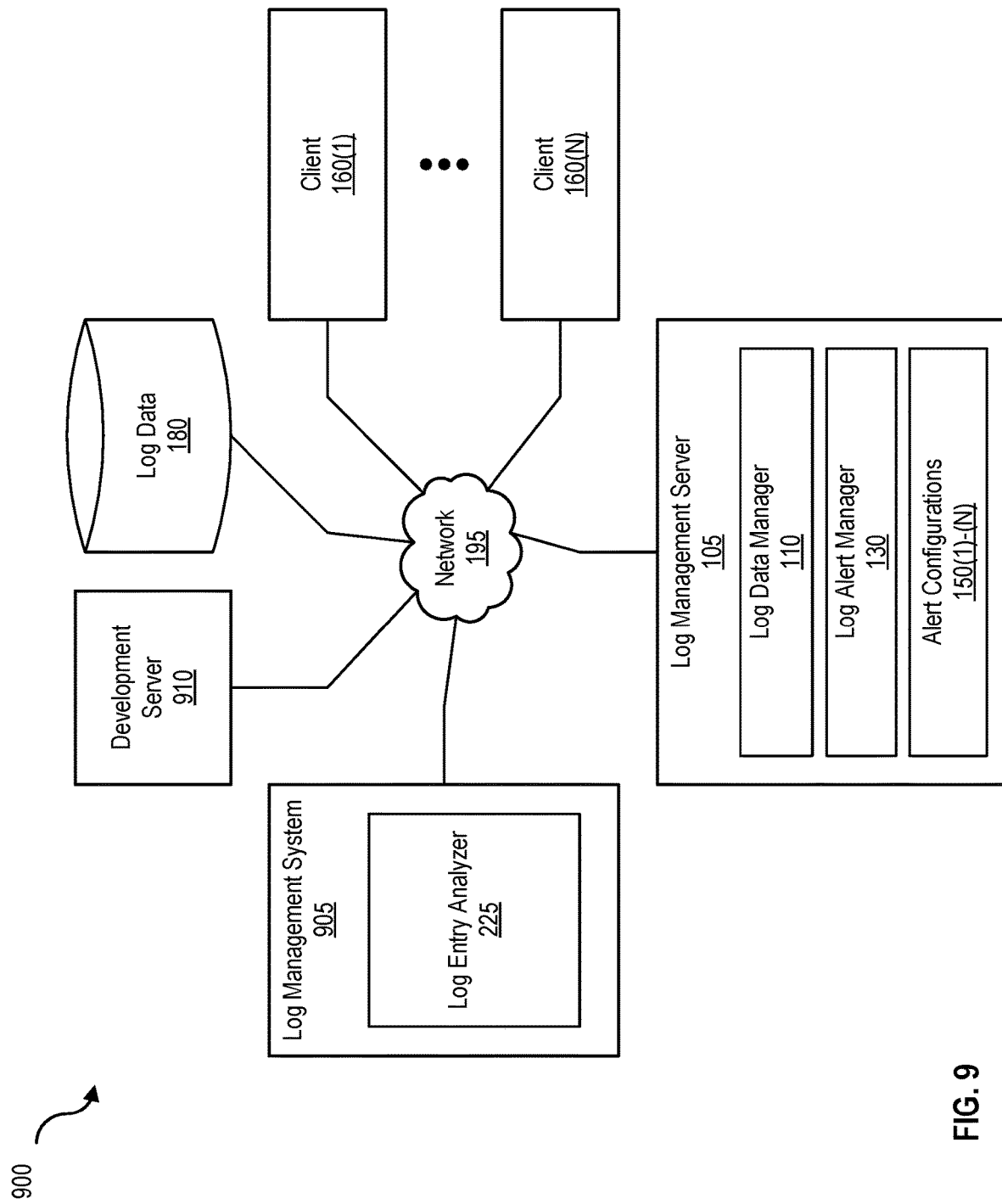
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 195 generally represents any type or form of computer network or architecture capable of facilitating communication between log management server 105, clients 160(1)-(N), developer system 190, and/or log management system 905. For example, network 195 can be a Wide Area Network (WAN) (e.g., the Internet) or a Local Area Network (LAN). In certain embodiments, a communication interface, such as communication interface 845 in FIG. 8, may be used to provide connectivity between log management server 105, clients 160(1)-(N), developer system 190, and/or log management system 905, and network 195.

In some embodiments, log data manager 110, log alert manager 130, and/or log entry analyzer 225 may be part of log management server 105 and/or log management system 905, or may be separate. All or a portion of one or more of the disclosed embodiments may be encoded as a computer program and loaded onto and executed by log management server 105 and/or log management system 905, and distributed over network 195. The embodiments described and/or illustrated herein are not limited to the Internet or any particular network-based environment.

In some examples, all or a portion of log management server 105 and/or log management system 905 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, log data manager 110, log alert manager 130, and/or log entry analyzer 225 may transform the behavior of log management server 105 and/or log management system 905 to perform automated log entry identification and alert management in cybersecurity computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
generating a template to track changes to a fixed part of a log statement of a set of log statements that causes a mismatch between a trigger pattern of an alert configuration and a log format string comprised in the log statement;
generating a search model from the template, wherein the template is generated for the set of log statements;
detecting a buildtime phase of program code, wherein the program code comprises the set of log statements;
providing the search model to a log entry analyzer at the buildtime phase, wherein the buildtime phase is configured by a buildtime engine;
receiving an update notification from the log entry analyzer;
updating a map file and a search index for the set of log statements;
extracting the fixed part and a variable part of the log format string comprised in the log statement;
determining that the set of log statements have been modified;
receiving a modified log statement from the set of log statements;
updating the search index; and
configuring an alert for the alert configuration without defining the trigger pattern.

2. The computer-implemented method of claim 1, further comprising:
generating a logging library at a runtime phase of the program code.

3. The computer-implemented method of claim 2, further comprising:
enhancing the logging library with metadata that comprises one or more alerts or one or more special values.

4. A non-transitory computer readable storage medium comprising program instructions executable to:
generate a template to track changes to a fixed part of a log statement of a set of log statements that causes a mismatch between a trigger pattern of an alert configurations and a log format string comprised in the log statement;
generate a search model from the template, wherein the template is generated for the set of log statements;
detect a buildtime phase of program code, wherein the program code comprises the set of log statements;
provide the search model to a log entry analyzer at the buildtime phase, wherein the buildtime phase is configured by a buildtime engine;
receive an update notification from the log entry analyzer; and
update a map file and a search index for the set of log statements;
extract the fixed part and a variable part of the log format string comprised in the log statement;
determine that the set of log statements have been modified;
receive a modified log statement from the set of log statements; update the search index; and configuring an alert for the alert configuration without defining the trigger pattern.

5. The non-transitory computer readable storage medium of claim 4, further comprising:
generating a logging library at a runtime phase of the program code.

6. The non-transitory computer readable storage medium of claim 5, further comprising:
enhancing the logging library with metadata that comprises one or more alerts or one or more special values.

7. A system comprising:
one or more processors; and
a memory coupled to the one or more processors, wherein the memory stores program instructions executable by the one or more processors to:
generate a search model from a template, wherein the template is generated for a set of log statements;
detect a buildtime phase of program code, wherein the program code comprises the set of log statements;
provide the search model to a log entry analyzer at the buildtime phase, wherein the buildtime phase is configured by a buildtime engine;
receive an update notification from the log entry analyzer; and update a map file and a search index for the set of log statements;
extracting a fixed part and a variable part of each log format string comprised in each log statement of the set of log statements;
generating the template for the set of log statements to track changes to the fixed part of each of the set of log statements that causes a mismatch between one or more trigger pattern of one or more alert configurations and each log format string;
determining that the set of log statements have been modified;
receiving one or more modified log statements from the set of log statements;
updating the search index; and configuring an alert for the alert configuration without defining the trigger pattern.

8. The system of claim 7, further comprising:
generating a logging library at a runtime phase of the program code; and
enhancing the logging library with metadata that comprises one or more alerts or one or more special values.

* * * * *